UNITED STATES PATENT OFFICE.

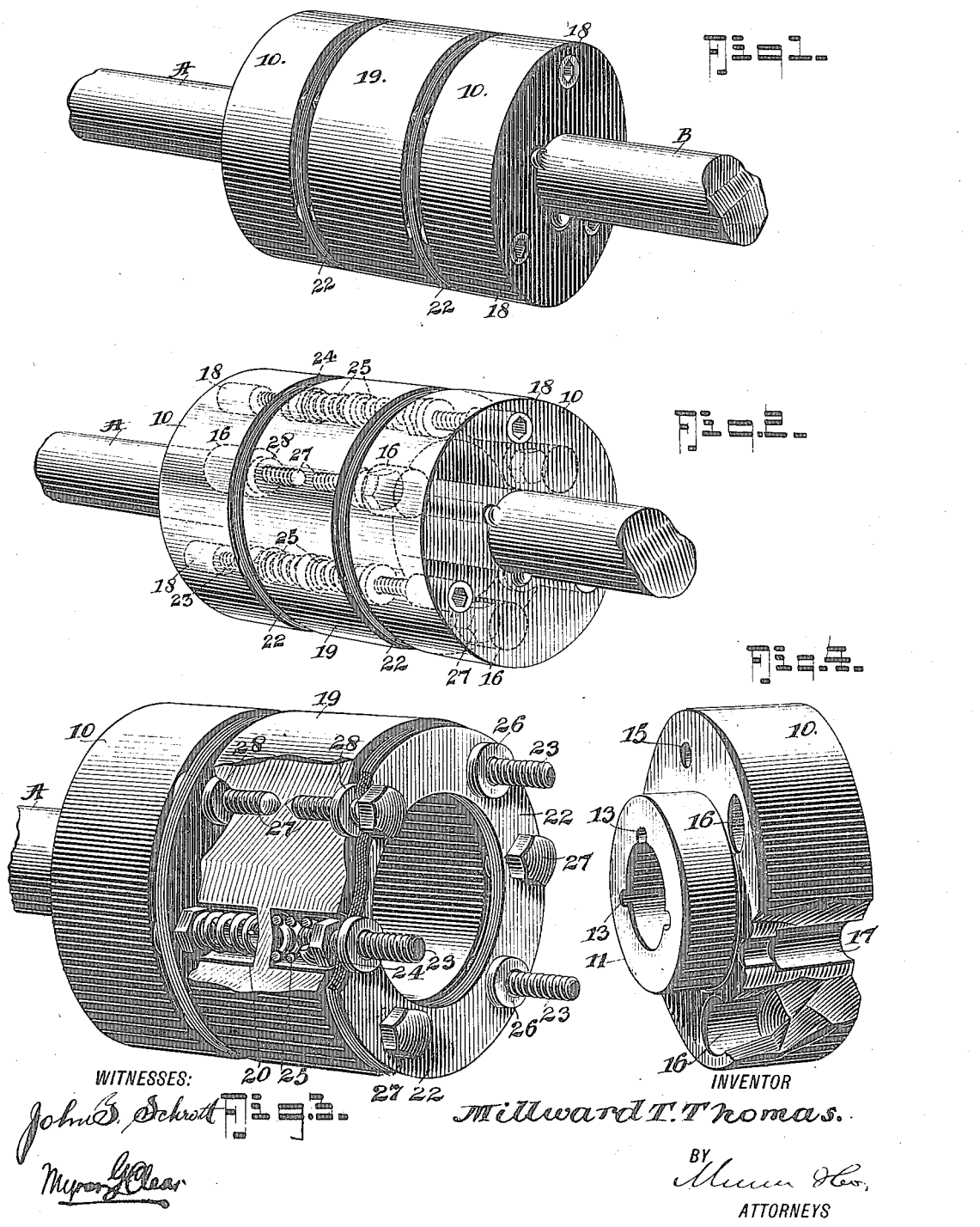

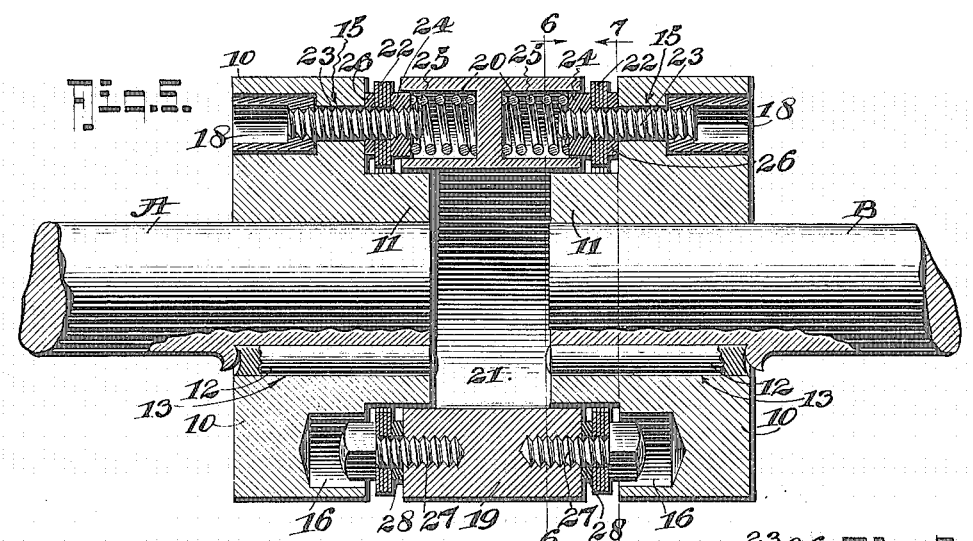
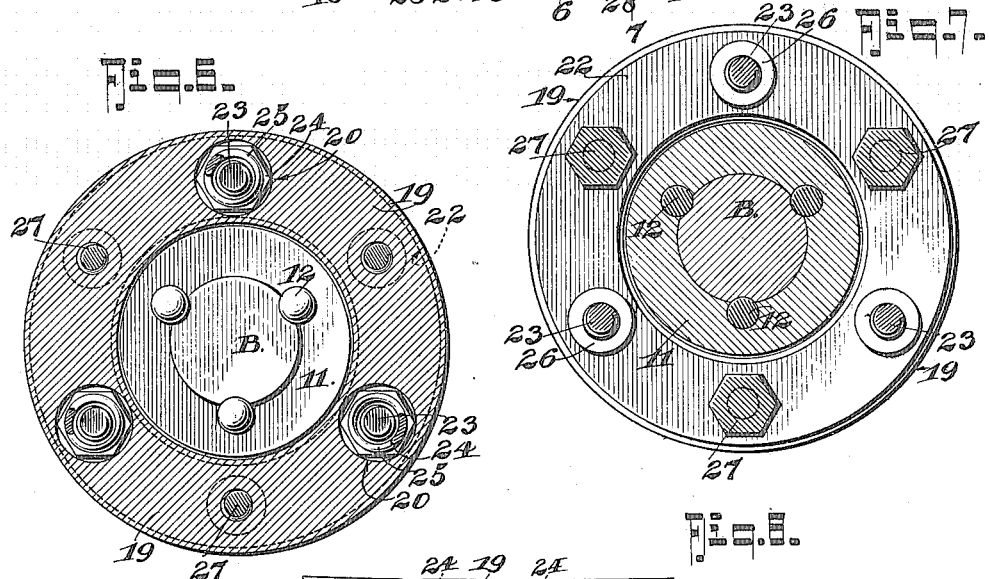
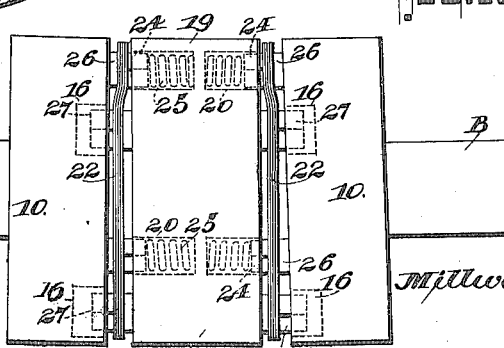

MILLWARD TREMAIN THOMAS, OF TROY, PENNSYLVANIA.

FLEXIBLE SHAFT-COUPLING.

1,188,113.  Specification of Letters Patent.  Patented June 20, 1916.

Application filed February 19, 1916. Serial No. 79,375.

*To all whom it may concern:*

Be it known that I, MILLWARD T. THOMAS, a citizen of the United States, and a resident of Troy, in the county of Bradford and State of Pennsylvania, have invented a certain new and useful Improvement in Flexible Shaft-Couplings, of which the following is a specification.

My present invention relates generally to shaft couplings, and particularly to a coupling whereby to flexibly connect shaft sections in such manner as to permit of each section assuming an angular position without affecting the transmission of rotative movement from one to the other, and my object is to provide a coupling, the structural parts of which are simple, durable, and inexpensive, and at the same time of such a nature as to provide for the use of laminated flexible rings and, from the nature of the said rings, obviate all danger of crystallization in use.

In the accompanying drawings wherein my invention is shown, Figure 1 is a perspective view of the coupling complete. Fig. 2 is a similar view wherein the connections for the flexible parts are shown in dotted lines. Fig. 3 is a detail perspective view, partly broken away and in section, illustrating one of the shaft sections with the coupling member and the flexible connection. Fig. 4 is a similar view illustrating one of the shaft heads removed, and partly broken away and in section. Fig. 5 is a vertical longitudinal section taken through the complete coupling. Fig. 6 is a vertical cross section taken therethrough substantially on line 6—6 of Fig. 5. Fig. 7 is a similar view taken therethrough substantially on line 7—7 of Fig. 5. Fig. 8 is a side elevation of the coupling illustrating flexing movements of the parts.

Referring now to these figures, each of the shaft sections A and B, one of which may be the driving shaft, is provided adjacent its connected end with an enlarged annular head 10, provided at its outer face with a reduced extension 11 terminating substantially flush with the end of the shaft as seen in Fig. 5, the head with its extension 11 being keyed to the shaft by keys 12 which are driven into position through internal guideways 13 of the head and are provided with concaved cutting ends 14 which cut away portions of the shaft as the keys advance.

The two heads 10 of the connected shaft sections A and B are identical in structure, and each is provided with an annular series of alternating openings 15 and recesses 16 in its outer face around the extension 11, both the openings 15 and recesses 16 having their axes parallel to the axis of the head.

The recesses 16 extend only partly through the head, while the openings 15 project entirely therethrough and are provided with counterbores 17 at the opposite face of the head for the reception of tubular nuts 18. Between the heads 10 and spaced therefrom is a tubular coupling member 19 having recesses extending into its opposite faces in line with the openings 15 of the two heads 10, as best seen at Fig. 5, wherein the recesses of the coupling member are indicated at 20, and by a comparison of Figs. 6 and 7.

The bore 21 of the coupling member receives the extension 11 of the heads 10 loosely therein, and between the coupling member so disposed and the heads 10 are arranged laminated flexible rings 22, said rings extending around the extensions 11 just mentioned and spaced therefrom as well as from the coupling member 19 and the two heads 10.

Each of the rings 22 is provided with an annular series of openings in alinement with the openings 15 and recesses 16 of the heads, and each ring is connected to its respective head by means of bolts 23 extending through certain openings of the ring and through the openings 15 of the head, these bolts being engaged at their outer ends by the tubular nuts 18 before mentioned, and being engaged at their opposite ends and upon the relatively opposite side of the ring from the head, by nuts 24, which latter extend into the recesses 20 at the adjacent side of the coupling member 19 and against springs 25 disposed in said recesses, the ring being maintained in spaced relation to the head to which it is thus connected, by washers 26 interposed therebetween and around the bolts 23.

Each ring 22 is also connected to the adjacent side of the coupling member 19 by machine screws 27 extending through the other ring openings in a direction relatively opposite to the direction of the bolts 23, the said machine screws 27 being threaded into conforming openings in the coupling member and having washers 28 thereon between the ring and the coupling member whereby to suitably space the same, the heads of the machine screws entering the recesses 16 of the adjacent head 10. Thus the several machine screws 27 connecting the rings with the coupling member alternate with the bolts 23 connecting the ring with the adjacent head 10, and the parts may thus be readily disassembled by removing the tubular nuts 18. Furthermore, the flexing rings 22 of the particular nature described, being connected at alternate points to the coupling member and the heads, enable each of the shaft sections A and B to assume angular positions, within certain limits of course, without materially affecting the transmission of rotative movement from one to the other. In addition to this each of the rings, being of the particular construction described and being supported and held as shown in spaced relation to the parts connected and in such manner as to normally assume a straight line, the particular construction obviates as far as possible all danger of crystallization which, due to the strains in use, is a factor most to be feared in devices of this nature.

I claim:—

1. In a flexible shaft coupling, the combination of shaft sections to be connected, heads secured upon the ends of the shafts and having reduced extensions projecting toward one another, each of said heads being provided with an annular series of openings and recesses extending in its outer face around said extension and alternating throughout the series, the said openings extending entirely through the head and having counter-bores at their opposite ends, a tubular connecting member disposed in spaced relation between the opposing heads and into the bore of which the extensions of said heads loosely project, laminated flexible rings disposed between the said heads and the said coupling member and extending around the extensions of the heads in spaced relation thereto and to the heads and the coupling member and provided with a series of openings alining with the openings and recesses of the heads, said coupling member having an annular series of threaded openings and recesses extending in its opposite faces and respectively alining with the recesses and openings of the heads, machine screws extending through the rings and into the threaded openings of the coupling member, the heads of which screws are received in the recesses of the opposing shaft heads, bolts extending through the other ring openings having nuts upon one end thereof extending within the recesses of the coupling member, springs within said recesses and against which the said nuts abut, the opposite ends of the said bolts extending within the openings of the shaft heads, tubular nuts within the said counter bores and engaging the last mentioned ends of the bolts, and spacing members disposed around the said bolts and machine screws respectively between the rings and the shaft heads and coupling member.

2. In a flexible shaft coupling, the combination with shaft sections to be connected, of heads secured upon said shaft sections in opposing relation and provided with reduced extensions at their opposing faces, a tubular coupling member between and in spaced relation to the said opposing heads and into the bore of which the said head extensions loosely project, laminated flexible rings disposed in the spaces between the said shaft heads and the said coupling member and surrounding the extensions of the heads in spaced relation thereto and to the coupling member, and connecting members for securing the said rings in spaced relation to the shaft heads and the coupling member, extending around each ring, the connecting members of the head and those of the coupling member being in alternating relation.

3. In a flexible shaft coupling, the combination with shaft sections to be connected, of heads secured upon said shaft sections in opposing relation and provided with reduced extensions at their opposing faces, a tubular coupling member between and in spaced relation to the said opposing heads and into the bore of which the said head extensions loosely project, laminated flexible rings disposed in the spaces between the said shaft heads and the said coupling member and surrounding the extensions of the heads in spaced relation thereto and to the coupling member, connecting members for securing the said rings in spaced relation to the shaft heads and the coupling member extending around each ring, the connecting members of the head and those of the coupling member being in alternating relation, and tubular nuts having bearings in the shaft heads and engaging certain of the said connecting members.

4. In a flexible shaft coupling, the combination with shaft sections to be connected, of heads secured upon said shaft sections in opposing relation and provided with reduced extensions at their opposing faces, a tubular coupling member between and in spaced relation to the said opposing heads and into the bore of which the said extensions loosely project, laminated flexible rings disposed in the spaces between the said shaft heads and the coupling member and surrounding the extensions of the heads in spaced relation thereto and to the coupling member, and means for securing the said rings in spaced relation to the shaft heads and the coupling member.

MILLWARD TREMAIN THOMAS.